(12) United States Patent
Yumoto et al.

(10) Patent No.: US 7,318,110 B2
(45) Date of Patent: Jan. 8, 2008

(54) STORAGE SYSTEM, STORAGE DEVICE AND INFORMATION COMMON SHARING METHOD BY UTILIZING STORAGE DEVICE

(75) Inventors: Kazuma Yumoto, Hachioji (JP); Keiko Tanigawa, Kawasaki (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 837 days.

(21) Appl. No.: 10/226,146

(22) Filed: Aug. 23, 2002

(65) Prior Publication Data

US 2004/0024909 A1    Feb. 5, 2004

(30) Foreign Application Priority Data

May 31, 2002    (JP)    ............................. 2002-158683

(51) Int. Cl.
*G06F 15/16*    (2006.01)
(52) U.S. Cl. ........................ 709/248; 709/204
(58) Field of Classification Search ................ 709/248, 709/225, 218, 205, 206, 204; 711/143, 162; 370/270
See application file for complete search history.

(56) References Cited

U.S. PATENT DOCUMENTS

| | | | | |
|---|---|---|---|---|
| 5,590,308 | A * | 12/1996 | Shih ........................... | 711/136 |
| 5,926,179 | A | 7/1999 | Matsuda et al. | |
| 5,928,351 | A * | 7/1999 | Horie et al. ................... | 712/11 |
| 6,070,232 | A * | 5/2000 | Ishida et al. ................. | 711/143 |
| 6,449,622 | B1 * | 9/2002 | LaRue et al. ................ | 707/201 |
| 6,480,953 | B1 * | 11/2002 | Hughes .......................... | 713/1 |
| 6,725,281 | B1 * | 4/2004 | Zintel et al. ................. | 719/318 |
| 6,813,726 | B2 * | 11/2004 | Dahlen et al. .................. | 714/6 |
| 6,822,945 | B2 * | 11/2004 | Petrovykh .................... | 370/270 |
| 6,883,073 | B2 * | 4/2005 | Arakawa et al. ............. | 711/162 |
| 6,938,055 | B2 * | 8/2005 | Iida et al. .................... | 707/201 |
| 6,944,662 | B2 * | 9/2005 | Devine et al. ............... | 709/225 |
| 7,010,303 | B2 * | 3/2006 | Lewis et al. ................. | 455/445 |

(Continued)

FOREIGN PATENT DOCUMENTS

| | | |
|---|---|---|
| JP | 10-154053 | 6/1998 |
| JP | 11-219309 | 8/1999 |

OTHER PUBLICATIONS

An Implementation and Performance Evaluation Of . . .—Oyama, Taura, Endo . . . (1998) www.osss.is.tsukuba.ac.jp/yosh/publications/./pdcs98-schematic-macky-a4.ps.gz.*

(Continued)

*Primary Examiner*—Thong Vu
(74) *Attorney, Agent, or Firm*—Mattingly, Stanger, Malur & Brundidge PC (57) ABSTRACT

The storage device is provided with a synchronization controller to realize synchronization control of information for the other storage devices when information is updated. This synchronization controller is further provided with a synchronization level registration table for registration and management of synchronization levels for every class of information and a synchronization interval registration table for registration and management of synchronization intervals of information pieces for the synchronization levels. Consequently, a load of communications may be alleviated by realizing common sharing/synchronization of information pieces among different systems and particularly by realizing loose common sharing/synchronization of information pieces depending on the characteristics of the information.

7 Claims, 10 Drawing Sheets

U.S. PATENT DOCUMENTS

| | | | |
|---|---|---|---|
| 2002/0198962 A1* | 12/2002 | Horn et al. ................. | 709/218 |
| 2003/0009530 A1* | 1/2003 | Philonenko et al. ........ | 709/206 |
| 2003/0037113 A1* | 2/2003 | Petrovykh .................. | 709/205 |
| 2006/0173959 A1* | 8/2006 | McKelvie et al. .......... | 709/204 |

OTHER PUBLICATIONS

Flexible Synchronization of Shared Groupware Objects—Lukosch, Unger (1999) www.informatik.fernuni-hagen.de/import/pi2/sl/papers/group99.ps.*

Online Computation of Critical Paths for Multithreaded . . . —Oyama, Taura, Yonezawa (2000) ftp.yl.is.s.u-tokyo.ac.jp/pub/papers/hips2000-critical-path-a4.ps.gz.*

Instant messaging with mobile phones to support awareness Mitsuoka, M.; Watanabe, S.; Kakuta, J.; Okuyama, S.; Applications and the Internet, 2001. Proceedings. 2001 Symposium on Jan. 8-12, 2001 pp. 223-230.*

Interaction and Outeraction: Instant Messaging in Action—Nardi, Whittaker (2000) www.research.att.com/~stevew/outeraction_cscw2000.pdf.*

Interviewing Over Instant Messaging—Amy Voida Elizabeth www.pliant.org/personal/Tom_Erickson/Voida_ChI01_InterviewOvrIM.pdf.*

"Effect of Instant Messages in a Company", by B. Ebitani, Nikkei Communications, 2001, vol. 11, No. 5, pp. 106-113.

* cited by examiner

| USER ID | STATUS | ACCESSIBILITY | COMMUNICATION TYPE | |
|---|---|---|---|---|
| userA001 | ON-LINE | POSSIBLE | — | |
| userA004 | OFF-LINE | — | — | |
| userB010 | ON-LINE | TEMPORARY NON-ATTENDANCE | — | |
| userC005 | ON-LINE | Do Not Disturb | — | |
| userC025 | ON-LINE | BUSY | TELEPHONE | |
| userD009 | ON-LINE | BUSY | TV CONFERENCE | |
| | ⋮ | ⋮ | | |

FIG. 6

| USER ID | TRANSFER SETTING | APPLICABLE MEDIA | ADDRESS | PORT |
|---|---|---|---|---|
| userA001 | — | IM | usrA001@im.aaa.jp | 5060 |
| userA004 | 09012345678 | — | — | — |
| userB010 | — | E-Mail | usrB010@pop.bbb.jp | — |
| | | IM | usrB010@im.bbb.jp | 8080 |
| userC005 | — | E-Mail | usrC005@pop.ccc.uk | — |
| userC025 | — | VoIP | usrC025@voip.ccc.uk | 5060 |
| | | IM | usrC025@im.ccc.uk | 5060 |
| userD009 | — | conference | usrD009@conf.dd.com | 1503 |
| | | IM | usrD009@im.dd.com | 5656 |
| | | VoIP | usrD009@voip.dd.com | 5060 |
| | ⋮ | ⋮ | | |

| CLASS OF INFORMATION | SYNCHRONIZATION LEVEL |
|---|---|
| CONDITION | 1 |
| ACCESSIBILITY | 1 |
| COMMUNICATION QUALITY | 1 |
| ⋮ | |
| TRANSFER SETTING | 5 |
| APPLICABLE MEDIA | 2 |
| ADDRESS | 3 |
| PORT | 3 |
| ⋮ | |

FIG. 8

| SYNCHRONIZATION LEVEL | 1 | 2 | 3 | ... | 5 | ... |
|---|---|---|---|---|---|---|
| SYNCHRONIZATION INTERVAL | 0 (REAL TIME) | 1 H | 1 2 H | ... | 2 4 H | ... |

FIG. 9

| USER ID | CONDITION NOTIFI-CATION ADDRESS |
|---|---|
| userA001 | userA002@sysA.com |
| | userA003@sysA.com |
| | userA004@sysA.com |
| ⋮ | ⋮ |
| userC005 | userA003@sysA.com |
| | userB010@sysB.com |
| | userC025@sysC.com |
| | userD009@sysD.com |
| | ⋮ |

STORAGE SYSTEM, STORAGE DEVICE AND INFORMATION COMMON SHARING METHOD BY UTILIZING STORAGE DEVICE

FIELD OF THE INVENTION

The present invention relates to a storage device and a storage system including the storage device and particularly to an information common sharing method utilizing the same storage device.

BACKGROUND OF THE INVENTION

As an instant message system, an independent system has been established as can be seen in the AIM (AOL INSTANT MESSENGER) of AOL (Trade Mark) (AMERICA ONLINE (Trade Mark)), and the communication tool provided under the trademark MSN MESSENGER or YAHOO MESSENGER. In these systems, it has been impossible to realize communication, for example, between a user who uses the AIM and a user who uses the MSN MESSENGER or YAHOO MESSENGER because the mutual communication property is not yet established between these systems.

Figure 11:
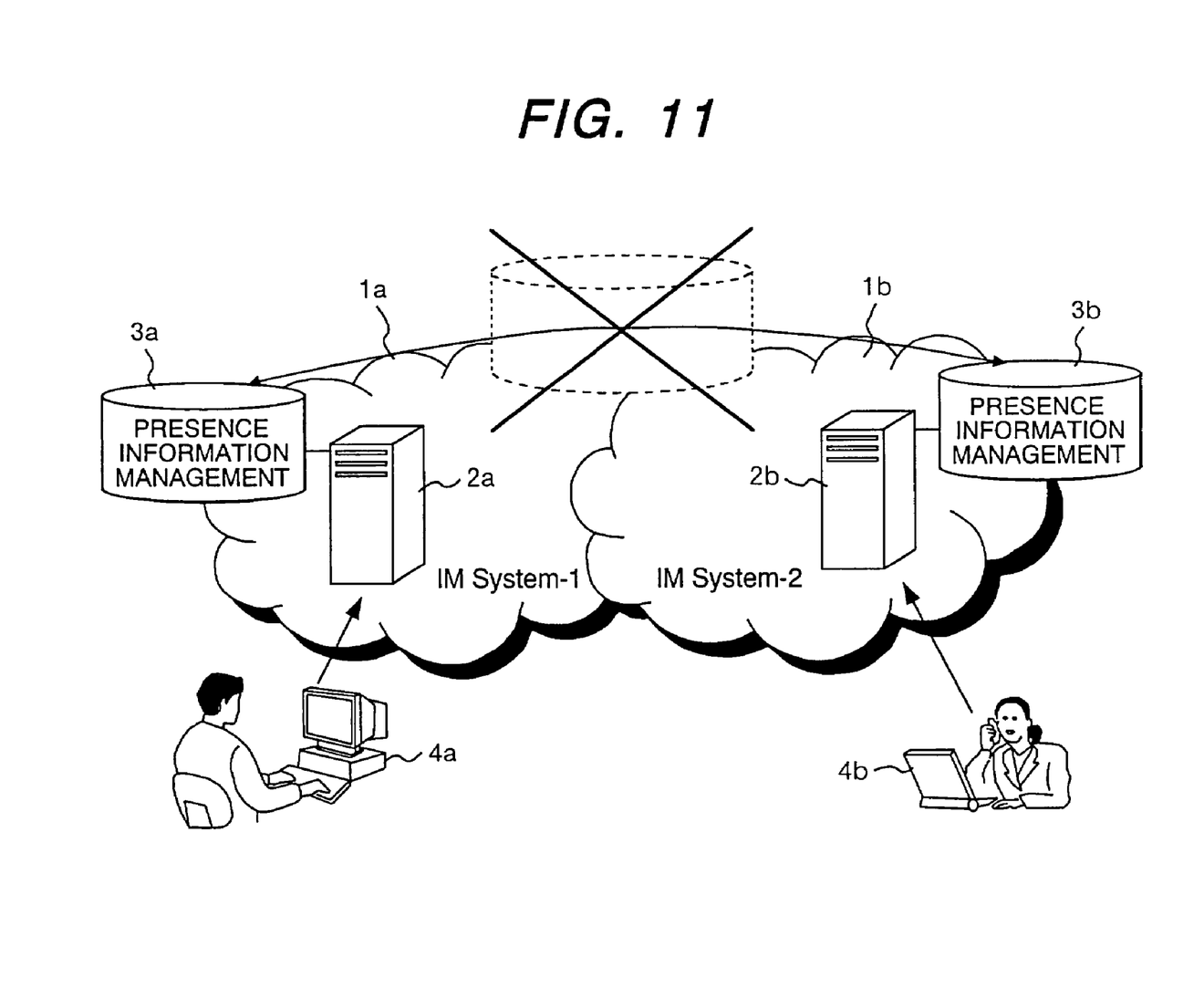
FIG. 11 is a system structural diagram indicating problems of the IM system of the prior art.

FIG. 11 is a system configuration diagram which illustrates practically the problems of the instant message system of the prior art. In the prior art system, since the connection ability between different systems is not yet established, it is impossible for the client terminals 4a, 4b belonging to different systems to realize the communication between the independent systems 1a, 1b. In addition to a problem that the common communication protocol is not yet provided for different systems, there exists a problem that a user A (terminal 4a) belonging to the system 1a and a user B (terminal 4b) belonging to the system 1b cannot detect the conditions of the partner with each other, because it is not yet possible to use in common or synchronize a user information collected by each system and a presence information of each user by transferring such information with each other.

The problems of the prior art illustrated in FIG. 11 are also described in the reference "Effect of Instant Messages in a Company" by Bin Ebitani (Nikkei Communications 2001, 11, 5; pp106-113).

The impp (Instant Messaging and Presence Protocol; protocol of instant message of which standardization work is progressed in the IETF) working group of IETF (Internet Engineering Task Force; Internet Technique Standardizing Committee) is planning to specify the standard specifications of the data format of presence information to be treated by the instant message system as an attempt to realize mutual connection between different instant message systems.

In order to realize mutual connection between the different instant message systems, not only the data format of information to be processed must be used in common but also a problem of how to transfer the information generated in each system to the other system must be solved.

In a practical example, it is required for a user of the AIM to know the presence information (on-line/off-line conditions) of a user having the account of the MSN messenger (communication tool of Microsoft Corp.) that the common sharing/synchronization of presence information of users must be realized among different systems.

However, common sharing of all information pieces by respective systems will require a storage device having a large amount of capacity and also require a large share in the management thereof. Moreover, even if it is not required to know the capacity of storage device and load of the management, when all information pieces are synchronized whenever the information is updated, communications between systems are generated frequently, resulting in a large amount of load on the communication apparatus and network.

SUMMARY OF THE INVENTION

The present invention realizes common sharing/synchronization of the information among different systems as in an example of the instant message system explained above, and particularly realizes alleviation of load of communications by realizing flexible common sharing/information synchronization depending on the characteristic of information in the storage device in the discrete environment.

In order to solve the problems of prior art explained above, the storage device of the present invention is provided with a synchronization controller to execute synchronization control for information to be transferred to the other storage devices when the relevant information is updated. The synchronization controller also includes a synchronization level management table for registration and management of synchronization level for every information class and a synchronization interval management table for registration and management of synchronization interval of the information for the synchronization level.

DESCRIPTION OF THE PREFERRED EMBODIMENT

A preferred embodiment of the storage device of the present invention will be explained with reference to the accompanying drawings as an example of application into an instant message system. The like elements will be designated with the like reference numerals throughout the drawings.

Figure 1:
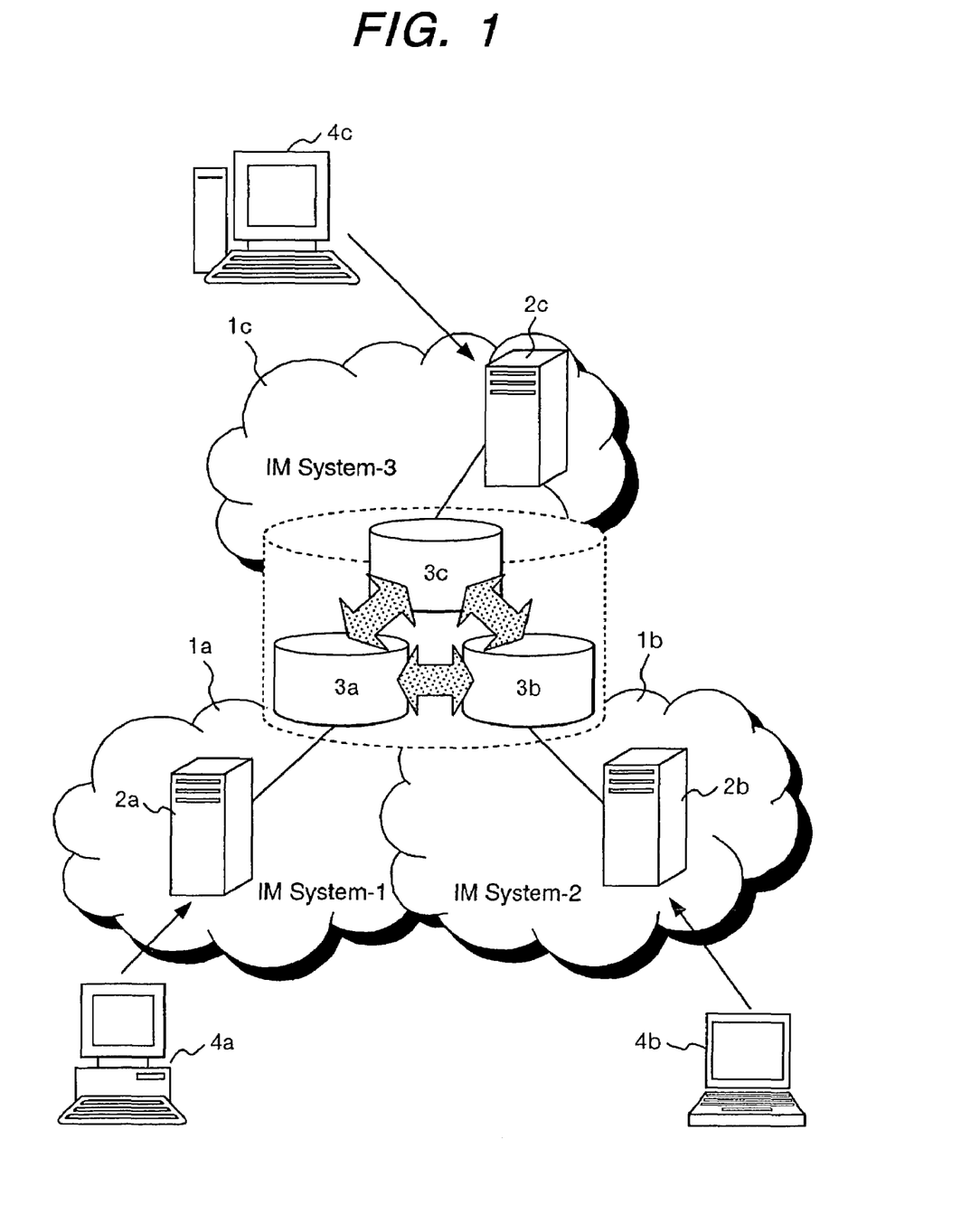
FIG. 1 is a diagram of an example of an instant message system structure of the present invention.

FIG. 1 is an example of the system structural diagram of instant message system of the present invention. Respective clients terminals 4a, 4b, 4c belonging to different systems are requested to make communications among the independent instant message systems 1a, 1b, 1c. For this purpose, only the common sharing of the communication protocol for the system is not enough and common sharing of user information and presence information is also necessary. In individual systems, the IM (Instant Message) servers 2a, 2b, 2c provided with the storage devices 3a, 3b, 3c for storing user information and presence information introduce the structure for relaying messages from respective client terminals 4a, 4b, 4c. In the present invention, user information and presence information are shared in common among different systems. Namely, the common virtual storage device among systems is actually formed of discrete storage devices 3a, 3b, 3c belonging to different systems. Employment of such structure enables communication for users of different systems by confirming the conditions thereof.

In more practical, common sharing of information with the other system and information synchronization can be realized while a load of communication is eased by changing the information synchronization timing among the storage devices depending on the class of information. The detail procedures will be explained below.

Figure 2:
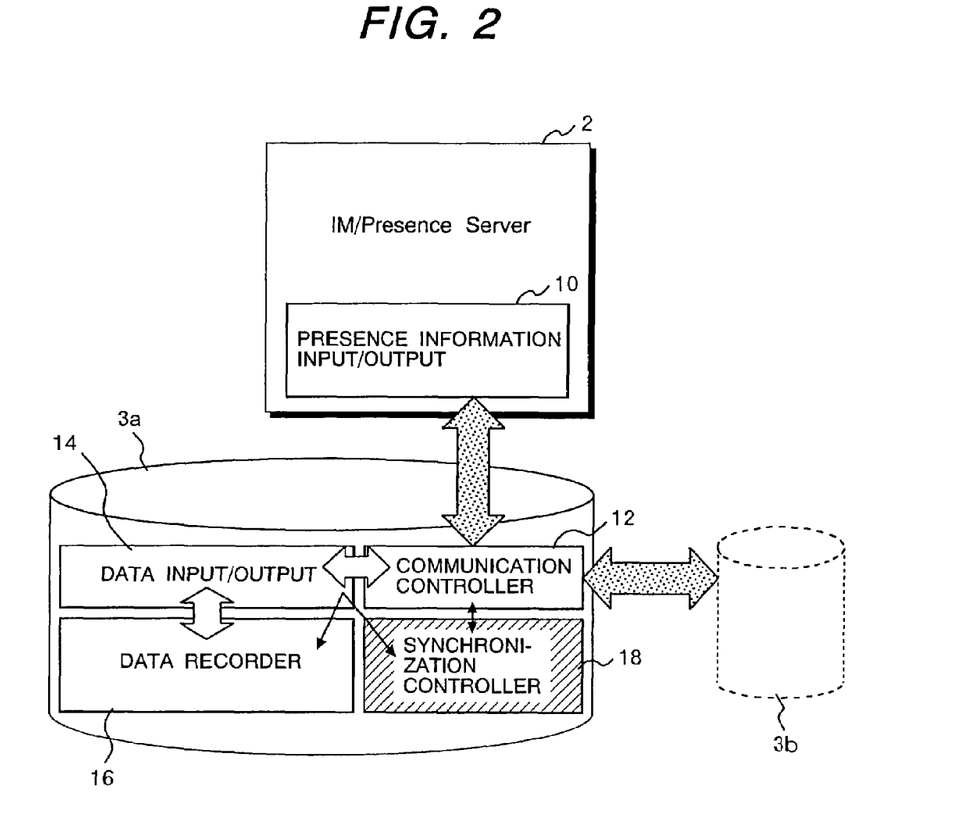
FIG. 2 is a structural diagram of an example of the instant message system in the server side.

FIG. 2 is a structural diagram of the storage device in the server side of the instant message system. The storage device of the present invention is composed of a communication controller 12, a data recorder 16, a data input/output 14 and a synchronization controller 18. The communication controller 12 executes data transmission and reception in combination with the IM/presence server 2 and the other storage device 3b. The data recorder 16 records various data such as user information and presence information. The data input/output 14 records the data received by the communication controller 12 onto the data recorder 16 and reads the data requested via the communication controller 12 from the data recorder 16. The synchronization controller 18 executes communication control of synchronization information for the other storage device 3b.

The storage device illustrated in FIG. 2 explained above may be provided as the storage device characterized by the following items (a) to (g).

(a) The storage device is provided with a plurality of client terminals and is connected to a network system including the servers provided for each client terminal. This storage device is also provided with a synchronization controller which notifies the updated information transmitted from the server to the other storage devices within the systems in order to control the synchronization of information pieces among the storage devices.

(b) The storage device explained in the item (a) is further provided with a communication controller, a data input/output and a data recorder. The communication controller receives the updated information transmitted from the server and the other storage devices of the system and also transmits the information to the server in response to the request from the server.

(c) In the storage device explained in the item (b), the data input/output writes the information received from the server with the communication controller and reads the information requested from the server via the communication controller. The data recorder records the information transmitted from the server and the other storage devices via the data input/output.

(d) The storage device explained in the item (a) controls the synchronization timing for notifying the updated information to the other storage devices by setting the synchronization interval for every class of information.

(e) The storage device explained in the item (d) is characterized by controlling the synchronization timing through the setting of the synchronization level for every class of information and the setting of the synchronization interval for every synchronization level regarding the synchronization timing for notifying the updated information to the other storage devices.

(f) The storage device explained in the item (d) or (e) is characterized by uniformly monitoring the passage of time for the synchronization interval in unit of information class or synchronization level for every updated information.

(g) The storage device explained in any one of the item (a) to (f) is characterized in that the information to be processed by the instant message system corresponding to one of the network systems is considered as an object of the information to be updated and the synchronization process for information recording and the other storage devices is executed to such information.

Figure 3:
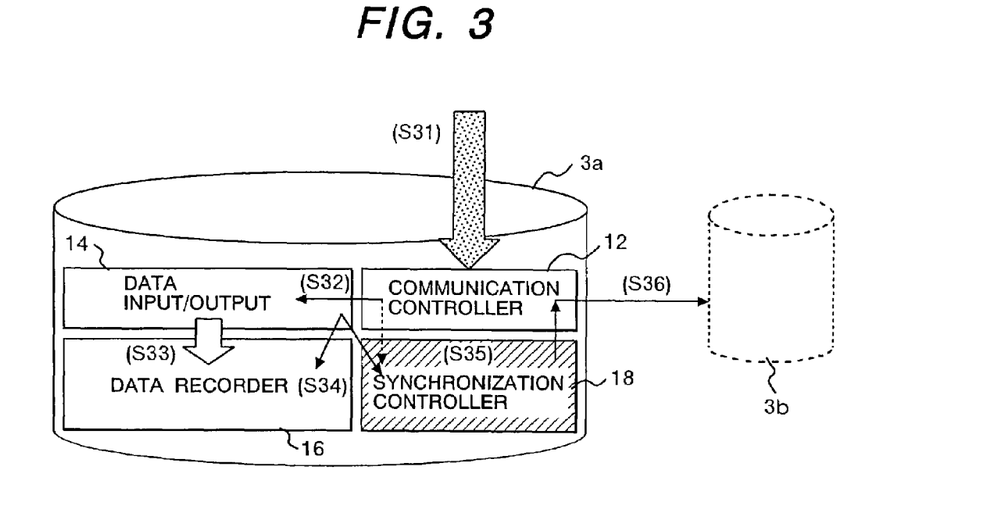
FIG. 3 is a structural diagram of a storage device illustrating the process sequence when information is updated.

FIG. 3 illustrates process sequence in the storage device 3a in the case where the presence information of a user belonging to own system is updated. When the presence information and setting are updated from the client terminal 4a and the IM/presence server 2a receives such update information, this update information is then transmitted to the storage device 3a (step 31). The communication controller 12 which has received the update information transfers the received update information to the data input/output 14 and simultaneously notifies the update of information to the synchronization controller 18 (step 32). The data input/output 14 writes the information transferred from the communication controller 12 to the data recorder 16 (step 33). The synchronization controller 18 having received the notification of information update confirms the class of information. Thereafter, the synchronization controller 18 synchronizes information by notifying the update information to the other storage devices 3b depending on the synchronization level and synchronization interval time preset in the synchronization interval management table as in FIG. 7, FIG. 8 for every class of information (steps 34 to 36). In this explanation, information update is notified to the synchronization controller 18 by the communication controller 12, but it is also possible that the data recorder 16 notifies the update information when the information is updated.

The process of the synchronization control 18 will be explained in detail by referring to the flowchart of FIG. 10. The synchronization controller 18 operates according to the following sequence during operation of the storage device (step 100). An information update notification from the server and the other storage devices in the own system is monitored (step 110) and when such information update notification is received, the class of information is confirmed (step 115). When the class of updated information is set to be synchronized immediately (step 120), the updated information is notified to the recorded synchronization notification destination (step 135).

Figure 7:
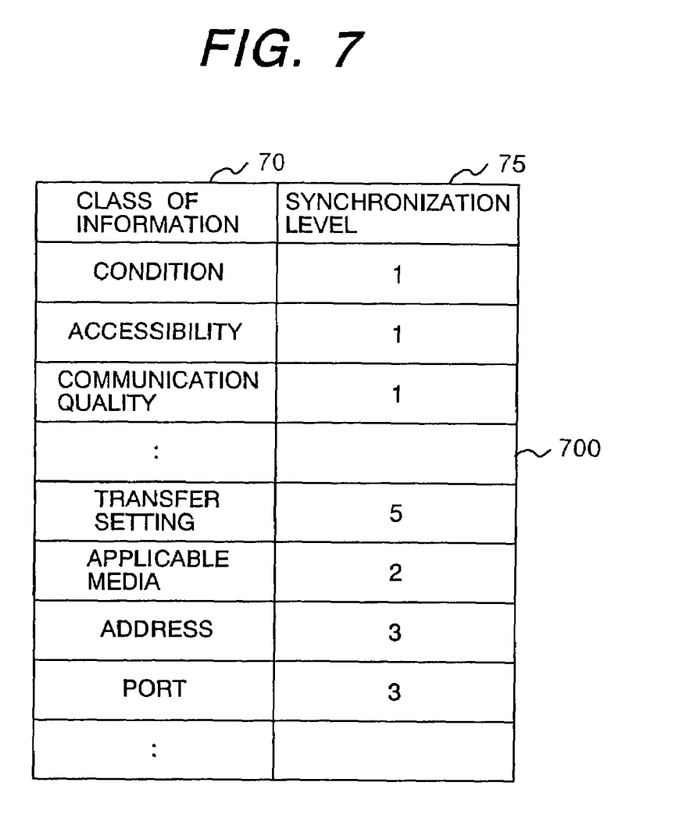
FIG. 7 is a diagram of a synchronization level management table for registration and management of synchronization level for every information class.
Figure 8:
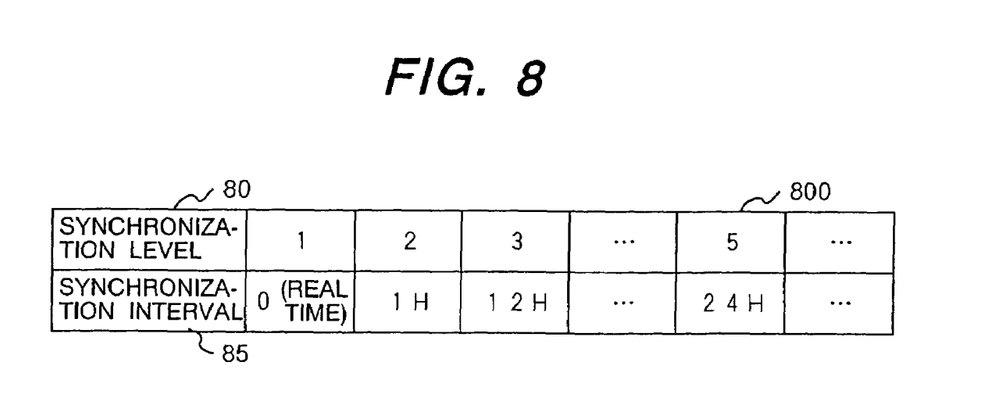
FIG. 8 is a diagram of a synchronization interval management table for registration and management of synchronization time intervals for every synchronization level.

Here, in regard to the synchronization timing of the updated information, a synchronization level management table 700 as shown in FIG. 7 and a synchronization interval management table as shown in FIG. 8 are preset in the data recorder 16 or in the synchronization controller 18. The effect of providing the synchronization interval management table in addition to the synchronization level management table lies in the point that setting of the synchronization interval 85 in each synchronization level 80 can be changed without changing the synchronization level 75 for every class of information 70. Meanwhile, the synchronization level management table and synchronization interval management table may be summarized to one table. In addition, it is also possible to introduce the table format for setting the synchronization interval 85 for every class of information 70 by eliminating the item of synchronization level. The effect of eliminating the classification item of synchronization level lies in the point that the synchronization interval can be set in direct for every class of information.

In FIG. 8, although a practical example is not illustrated, a setting value is also prepared to indicate that "synchronization is not executed", on the contrary to the setting of 0 (real-time) for synchronization interval, when a value of the synchronization level is 1.

For the setting of items and values of the synchronization level management table and setting of the values of the synchronization interval management table, there is employed a method in which the information pieces of these management tables are processed as the setting files and the values of the setting files are updated. For the update of the setting information pieces, a method which is generally introduced in a router is used. For example, a method of introducing an exclusive setting program which is used from the terminal and a method for executing the setting by using a browser are used. A method in which the setting information is updated from a browser will be explained below. A server program to form a client server system such as the simplified Web server (Word Wide Web) for realizing access with HTTP (Hyper Text Transfer Protocol) and a form image to realize input and update of setting information from the browser are provided in the side of storage device 3.

Figure 10:
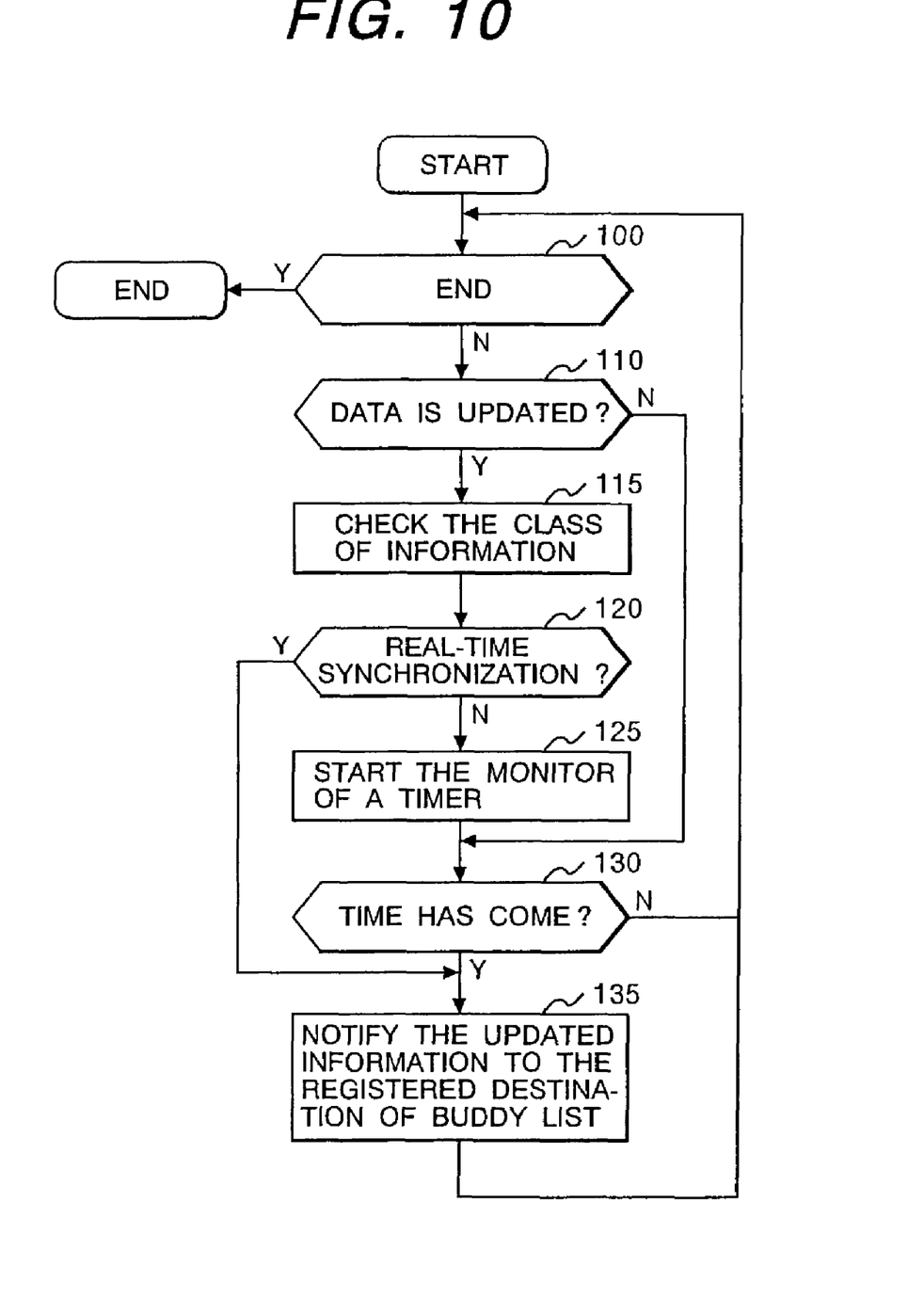
FIG. 10 is a diagram of a flowchart of a synchronization controller.

Returning to explanation of FIG. 10, when the synchronization interval is not the real-time, every updated information is monitored with a timer to measure the time up to the preset time (step 125). When the preset synchronization interval time has come (step 130), the updated information is notified to the registered synchronization notifying destination (step 135). As a method of monitoring the synchronization interval time, it is also possible to introduce a method to individually start the measurement of synchronization interval time whenever the information is updated. However, it is also possible to introduce the method that passage of time is always monitored for every synchronization level and the information updated during this period is checked, for example, by setting a flag. When the synchronization interval time has come (step 130), the updated information is notified to the registered synchronization notifying destination (step 135). In the latter method, the process to start the monitoring with a timer in the step 125 is no longer required, but there is required a process to start the monitoring with a timer for passage of time in every setting of synchronization as the initial setting when the device is driven.

The update method for the presence information of a user based on the process sequence of FIG. 3 explained above may also be provided as an information common sharing method utilizing the storage device characterized as explained below in the items (i) to (iv).

(i) An information common sharing method utilizing storage devices connected to a network system in which a plurality of client terminals are provided and servers are also provided for every client terminals, characterized in comprising the steps of updating a presence information of a user by a client terminal, transferring the updated information to a storage device from a server and notifying the updated information to the other storage device in the system by a synchronization control unit of the storage device by receiving the updated information.

(ii) The information common sharing method explained in the item (i) characterized in including, in the notifying step, a step of checking a class of information by the synchronization control unit at the time of receiving the update notification after monitoring this update notification transmitted from the server or the other storage device.

(iii) An information common sharing method explained in the item (ii) characterized in comprising the step of notifying the updated information to the other storage device of the synchronization notifying destination, when the information class is set to the real-time synchronization, and executing monitor of updated information with a timer based on the synchronization interval management table provided in the synchronization control unit, when the information class is not set to the real-time synchronization.

(iv) An information common sharing method explained in the item (iii) characterized in comprising the step, in the execution step, of notifying the updated information by the synchronization control unit to the synchronization notifying destination when the synchronization interval time preset in the synchronization interval management table has come.

Figure 9:
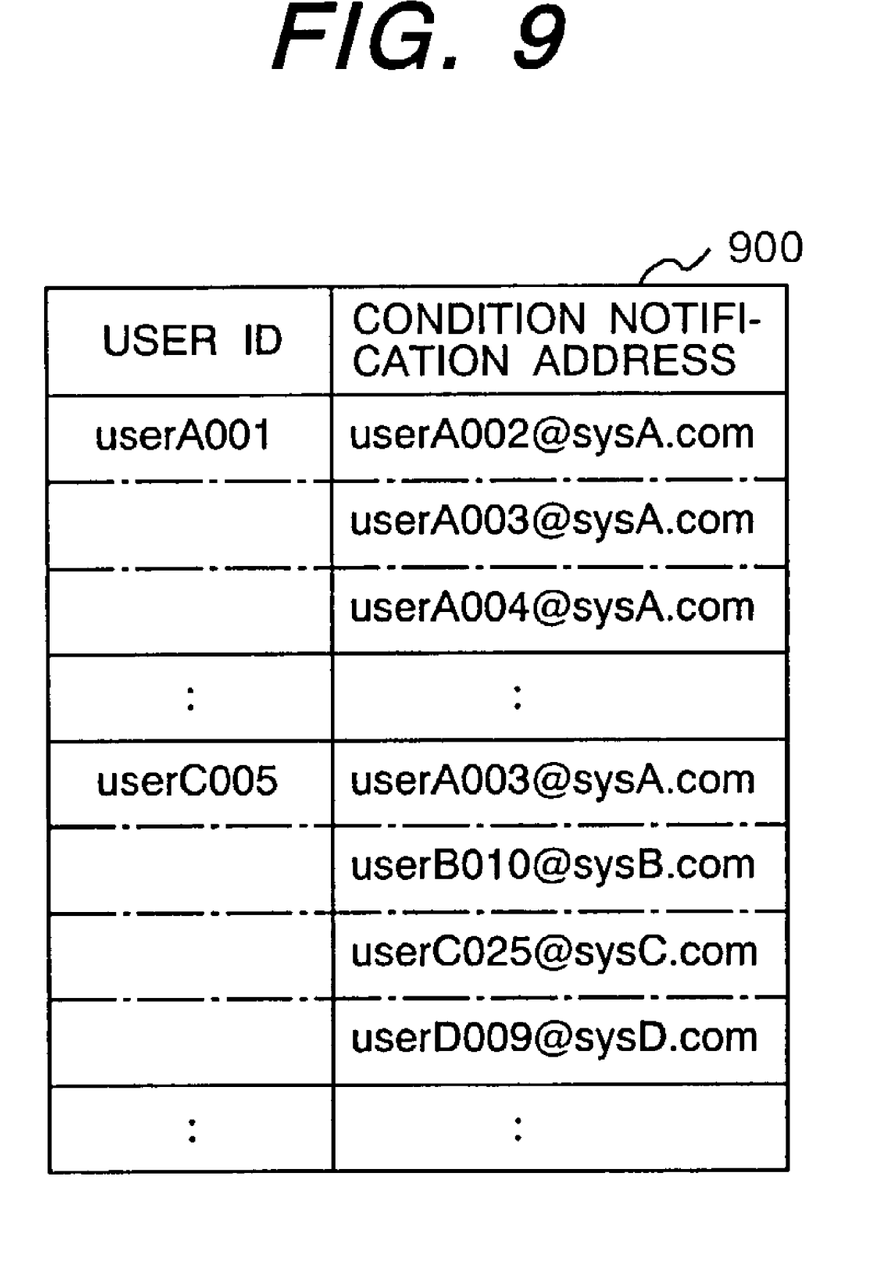
FIG. 9 is a diagram of a Buddy list management table.

A table 900 of FIG. 9 illustrates an example of a Buddy list (Friend list) management table in unit of user belonging to the same system. Users as the status notifying destinations to be registered in unit of user may include users of the other systems. This Buddy list is used as an address book of each user but may also be used for referring to the synchronization information notifying destination in the present invention. Since the information to be updated is placed under the management in unit of user as illustrated in the management tables 500, 600 of FIG. 5 and FIG. 6, this management table is searched using a user to which the updated information belongs as a key. A list of users to which the information updated in the status or the like is notified is extracted and the updated information is notified to the storage device of the system to which the relevant user belongs. The Buddy list management table is placed under the management by the data recorder 16.

The synchronization notifying destination may be notified to the Buddy list registration destination as explained above or to all of the other storage devices.

Figure 4:
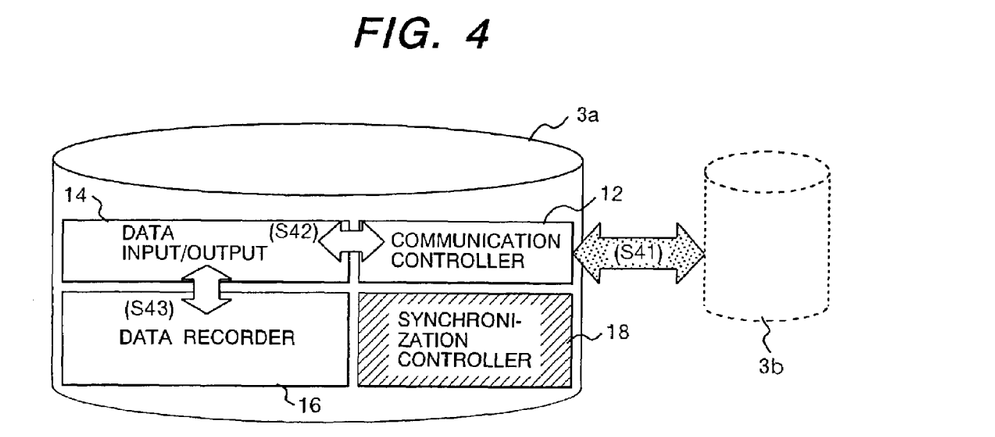
FIG. 4 is a structural diagram of the storage device illustrating the process sequence when information is synchronously notified.

FIG. 4 illustrates a process sequence in the storage device 3*a* when the information synchronization notification is received from the other storage device 3*b*. The information synchronization notification generated from the other storage device 3*b* is received by the communication controller 12 (step 41). The communication controller 12 which has received the synchronization information transfers the received synchronization information to the data input/output 14 (step 42). The data input/output 14 writes the information received from the communication controller 12 to the data recorder 16 (step 43).

Figure 5:
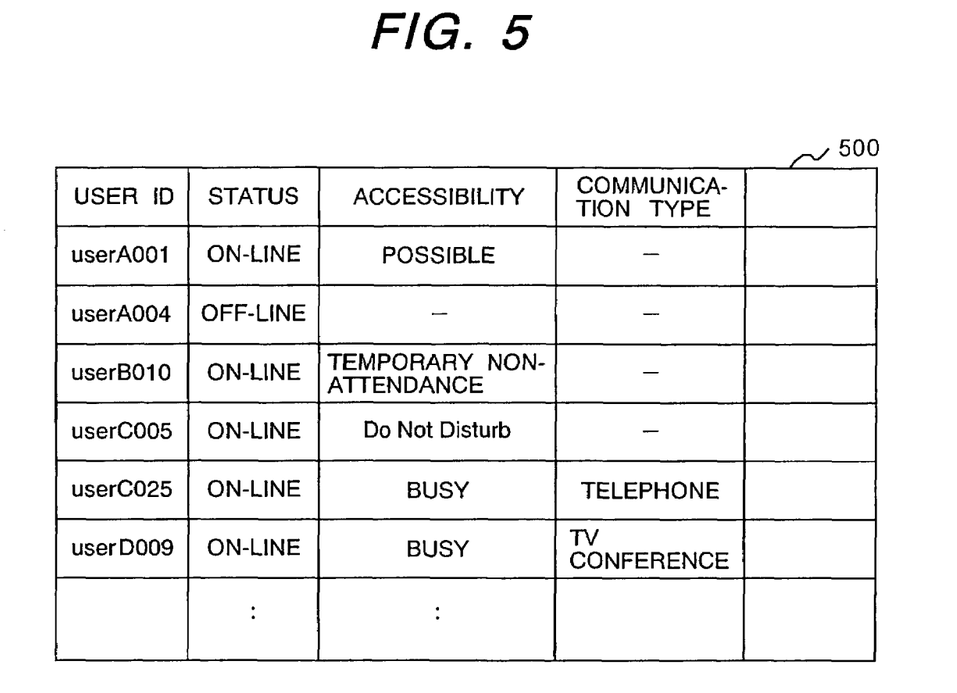
FIG. 5 is an information management table for registration and management of information pieces which are synchronized on the real-time basis.
Figure 6:
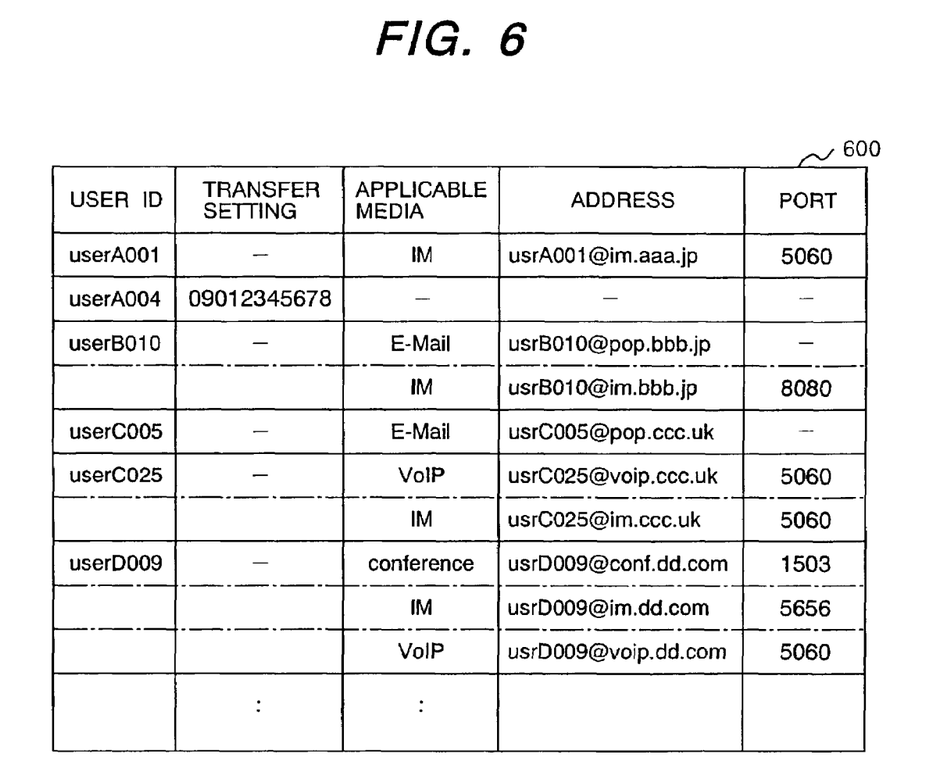
FIG. 6 is a diagram of the information management table for registration and management of information pieces which are object of loose synchronization.

FIG. 5 and FIG. 6 respectively illustrate the management tables 500 and 600 of information to be recorded to the data recorder 16. FIG. 5 illustrates an example of the management table of information to be synchronized on the real-time basis, while FIG. 6 illustrates an example of the management table of information as the flexible synchronization object. Here, the management tables 500 and 600 are illustrated individually but these management tables may be uniformed to only one information management table.

Figure 12:
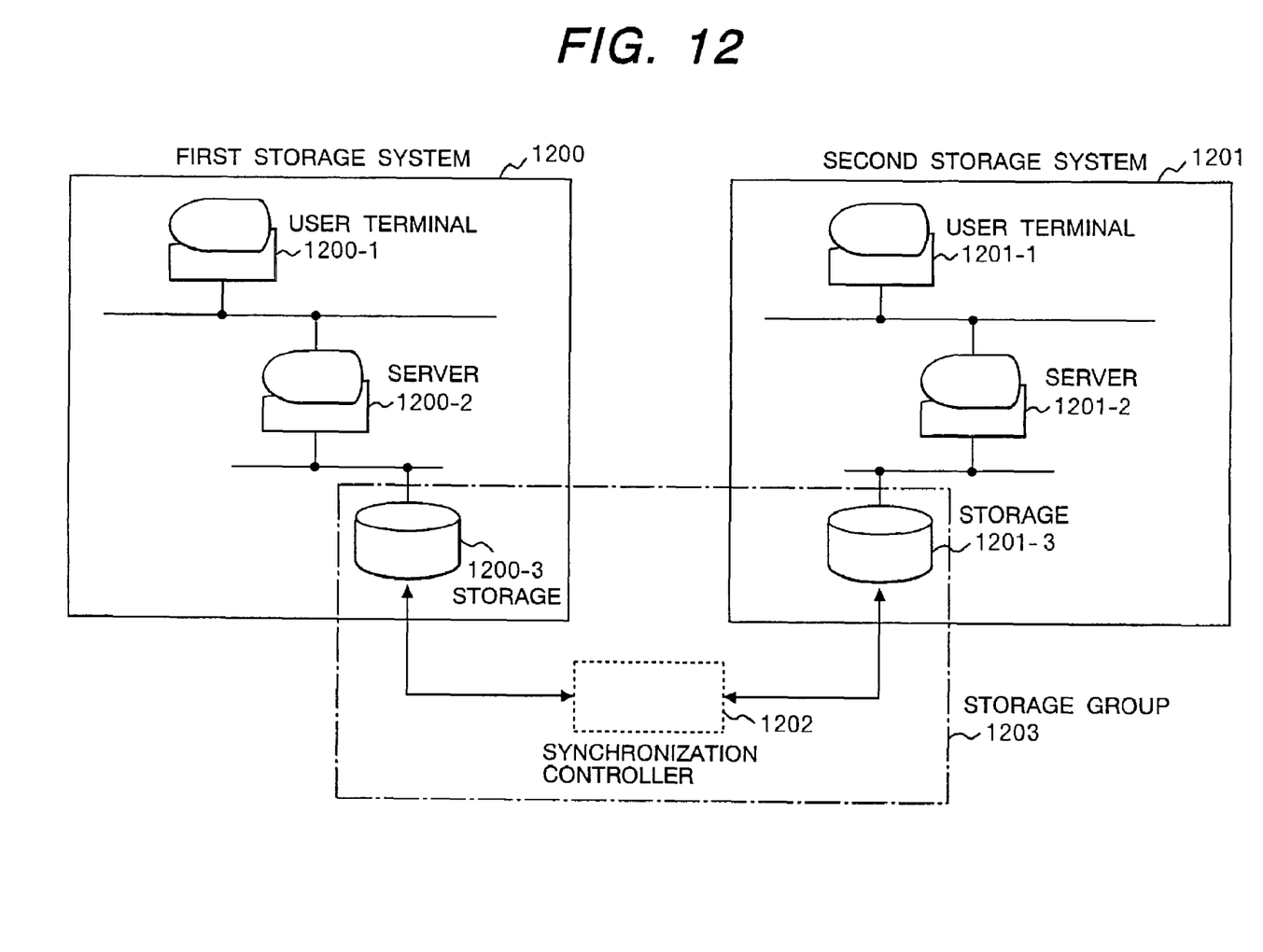
FIG. 12 is a diagram of a modification example of the instant message system structure of FIG. 1.

FIG. 12 illustrates a modification example of the instant message system structure of FIG. 1 of the present invention. The first and second storage systems are different from each other. The first storage system comprises a user terminal 1200-1, a server terminal 1200-2 and a storage device 1200-3, while the second storage system comprises a user terminal 1201-1, a server terminal 1201-2 and a storage device 1201-3. Between the first and second storage systems, a synchronization controller 1202 is provided. This synchronization controller 1202 controls synchronization of updated information existing between the storage devices 1200-3 and 1201-3.

In more practical, this controller 1202 executes the synchronization control so that the updated information transmitted from the servers 1200-2, 1201-2 can be notified to the storage device 1201-3 by the storage device 1200-3, or the updated information can be notified to the storage device 1200-3 by the storage device 1201-3.

In FIG. 12, the synchronization controller 1202 may also be provided adjacent to the storage device 1200-3 within the first storage system. Otherwise, the synchronization controller 1202 may also be disposed adjacent to the storage device 1201-3 within the second storage system. The synchronization controller 1202 is provided within a storage group 1203 including the storage devices 1200-3 and 1201-3.

An example of the instant message system structure illustrated in FIG. 12 may also be provided as the storage system having the characteristics of items (I) to (III) explained below.

(I) A storage system in the first and second storage systems for exchanging updated information pieces by comprising user terminals, servers for management of these terminals and storage devices for storing information pieces from the servers, further comprising a synchronization controller for notifying the updated information transmitted from the servers of the first storage system to the storage device of the second storage system and controlling synchronization of information pieces among the storage devices.

(II) A storage system explained in the item (I) characterized in that the synchronization controller confirms the class of information based on content of the updated information and notifies the updated information to the storage device of the second storage system depending on the setting condition preset for every information class.

(III) A storage system explained in the item (II) characterized in that the setting condition is the synchronization interval time preset corresponding to the synchronization level and the synchronization controller controls the timing for notifying the updated information to the storage device of the second storage system based on the synchronization interval time.

As explained above, when the information is updated, the updated information is notified to the other storage device in the discrete environment depending on the class of information updated by utilizing the storage device depending on the embodiment of the present invention. Therefore, common sharing of information and synchronization of information with the other systems can be realized while alleviating the load applied on the communications.

What is claimed is:

1. A common storage system connected with first and second storage systems for exchange of information associated with instant messaging between the first and second storage systems, each of said first and second storage systems having user terminals and a server for management of the respective terminals, comprising:

storage devices corresponding to each of said first and second storage systems, each of said storage devices having a synchronization controller which notifies the updated information to the other storage device, said update information including presence information, and said synchronization controller controlling the synchronization of the update information between the storage devices of said first and second storage systems;

wherein said synchronization controller determines a class of said update information and notifies said updated information to said storage devices of said second storage system depending on the setting condition preset for said class of information; and wherein said setting condition is a synchronization interval time that is preset corresponding to a synchronization level, and said synchronization controller controls the timing for notifying said update information to said storage devices of said second storage system based on said synchronization interval time.

2. At least one storage device for exchange of information associated with instant messaging to other storage devices, connected to a network system provided with a plurality of client terminals for instant messaging among said client terminals and servers for the client terminals, comprising:

each said storage device including a synchronization controller which notifies update information to said storage device of another said client terminal, said update information including presence information related to instant messaging at one of said client terminals, wherein said synchronization controller controls synchronization of the update information between the storage devices by notifying the update information transmitted from the other storage device in said network system;

wherein said synchronization controller controls synchronization timing for notifying said update information to said other storage devices by setting the synchronization interval for a class of information; and wherein said synchronization timing is controlled by setting the synchronization level for said class of information and also by setting the synchronization interval for the synchronization level for notifying said update information to said other storage devices.

3. The at least one storage device according to claim 2, wherein said storage device is further provided with a communication controller, a data input/output and a data recorder, and wherein said communication controller receives the update information transmitted from said servers and transmits the update information to said servers in response to requests from said servers.

4. The at least one storage device according to claim 3, wherein said data input/output writes the update information received by said communication controller from said servers and reads the update information requested from said servers via said communication controller, and wherein said data recorder records the update information transmitted from said servers and the storage devices via said data input/output.

5. The at least one storage device according to claim 2, wherein said synchronization controller monitors passage of time for said synchronization interval that is performed for the update information, in units of class of information uniformly or in units of synchronization level uniformly.

6. The at least one storage device according to claim 2, wherein information to be processed for instant messaging is the object of said update information, and wherein the process of transmitting said updated information is executed simultaneously with recording of information between the client terminals.

7. An information sharing method for sharing information used in instant messaging among storage devices connected to a network system providing a plurality of client terminals and including servers provided for the client terminals, said method comprising the steps of;

updating presence information of users using said client terminals;

transferring said presence information to said storage devices by said servers; and notifying said presence information by a synchronization control unit provided in said storage devices to other storage devices provided in said network system after receiving said updated presence information being updated;

monitoring said updated presence information transmitted from said servers or the other storage devices by said synchronization control unit;

confirming a class of information at the time of receiving said updated presence information;

notifying said updated presence information to the other storage devices at the synchronization notifying destination to which the updated presence information should be notified, when said class of information is set to the real-time synchronization;

performing monitoring with a timer for said undated presence information based on the synchronization interval management table provided in said synchronization control unit, when said class of information indicates that the synchronization interval is not set to the real-time synchronization; and wherein in said step of performing, said synchronization control unit notifies said updated presence information to said synchronization notifying destination when a synchronization interval time preset in the synchronization interval management table has elapsed.

* * * * *